June 2, 1959  M. M. DI GIOVANNI  2,889,526
MOTION SENSING DEVICE
Filed July 2, 1956
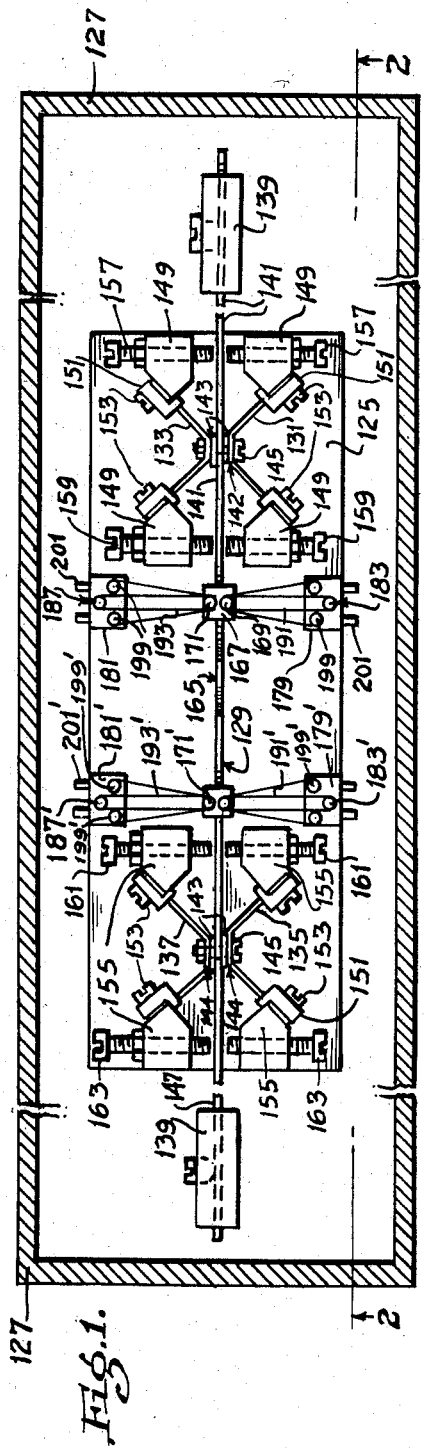
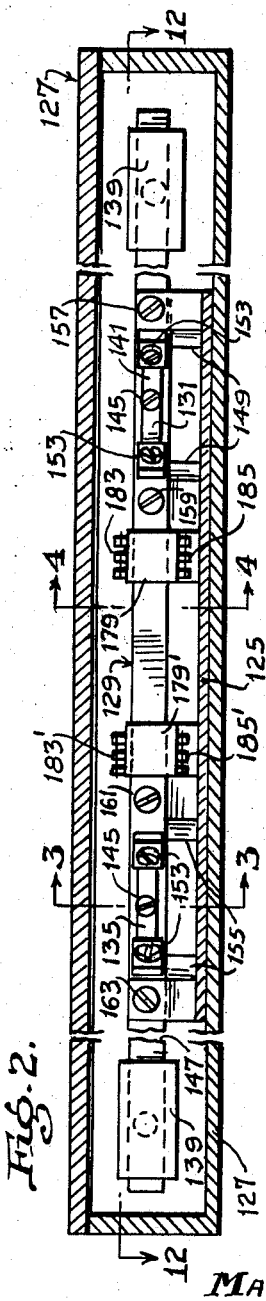
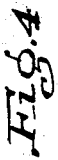
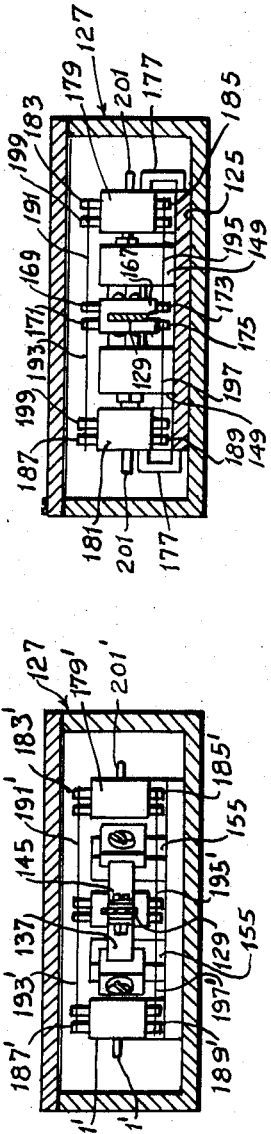
INVENTOR.
MARIO Di GIOVANNI
BY
Philip Surkow
ATTORNEY.

United States Patent Office 2,889,526
Patented June 2, 1959

2,889,526

MOTION SENSING DEVICE

Mario M. Di Giovanni, Pacific Palisades, Calif., assignor to Statham Instruments, Inc., a corporation of California Application July 2, 1956, Serial No. 595,494

11 Claims. (Cl. 338—2)

This application is a continuation-in-part of my co-pending U.S. applications Serial Nos. 515,111 (now Patent No. 2,840,675), 515,112 and 515,196, all filed June 13, 1955, the two latter applications now abandoned.

The instant invention relates to a transducer such as a motion sensing device, displacement meter, accelerometer, and other transducers, and more particularly concerns instruments for measuring movements, forces, accelerations, and the like. Thus, for example, one embodiment of the invention is concerned with an accelerometer incorporating a wire resistance strain gauge of the so-called unbonded type.

Unbonded strain gauges are generally composed essentially of a strain sensitive wire connected to two supports which are subject to separation under an applied force. When subjected to tension the wire changes in dimensions, and therefore changes in resistance. Means are provided for measuring the resulting change in resistance which is then translatable into a measurement of the applied force. Such gauges have found a wide application in industry.

In my above co-pending applications I have disclosed a transducer comprising a flexible beam supported intermediate its ends on a flexible support or flexure, and a motion sensing means such as a strain wire gauge associated with the outer end of the beam beyond said flexible support. The transducer, e.g., in the form of a pressure gauge, dynamometer or accelerometer, comprises a frame, and the flexible support or flexure member is connected to said frame and to said flexible beam at spaced points intermediate the ends of said beam and at an angle thereto, to provide spaced and localized points of bending in said flexure member intermediate the ends of said beam. Means, e.g., in the form of a pressure chamber or rod, is provided for applying a force to said beam to produce a deflection of said beam on said flexure member at points between the flexure member in a direction opposite to the direction of deflection of said beam at points beyond said flexure member.

This invention is particularly useful in connection with the application of electrical resistance strain wire transducers in which the application of a load varies the strain in a fine wire resulting in a change in resistance which is proportional to the strain induced in the wire. Such transducers have been applied to accelerometers as is illustrated in the Statham Patent No. 2,573,285, issued October 30, 1951. In such systems the spring constant and permissible magnitude of strain which may be induced in the strain wire determines the natural frequency, and the number of wires and their spring constant determine the mass that must be employed to obtain the desired displacement on application of the accelerating force.

Since in such transducers the values of the strain wires employed place a practical limit on the permissible strain which may be developed in the fine wires which are used in such strain wire transducers, the wires must be made either excessively long or one is forced to accept a relatively larger value of the natural frequency.

Modern instrumentation requires that the accelerometers be made very small. Such size limitations impose a restriction on the permissible length of the strain wires and also impose a restriction on the permissible mass of the inertial element, thus resulting in accelerometers having relatively high values of their natural frequency and small permissible displacements of their inertial masses.

Another consequence of this design is that in order to reduce the natural frequency and increase the permissible displacement, the weight of the inertial mass must be made relatively larger and a sufficient multiplicity of wires must be looped between the mass on the frame on which the mass is suspended in order that the desired displacement be obtained within the limits of the permissible strain on the wire.

One object of this invention is the provision of a motion sensing device comprising a force summing member connected to a motion sensing means in which a movement of the force summing member is transmitted as a movement to the motion sensing means, preferably in the form of a strain wire gauge, the movement of the motion sensing means being smaller, the same as, or larger than the movement of said force summing member.

It is another object of my invention to design an accelerometer in which an inertial mass is connected to an electrical strain wire transducer and in which the displacement of the mass may be made independent of and different from the variation in extension of the wire resulting from the displacement of the mass.

It is another object of my invention to design an accelerometer having a mass suspended on a yieldable suspension whereby the movement of the mass is sensed by an electrical strain wire transducer, so that a motion of the mass on acceleration causes a variation in extension of the strain wires.

A still further object of the invention is the provision of a motion sensing device or accelerometer including a strain wire transducer, and wherein the displacement of the mass is substantially greater than the extension of the strain wire due to said displacement.

Other objects and advantages of the invention will appear hereinafter.

In my copending application filed of even date herewith, I have disclosed and claimed a motion sensing device comprising a beam which is freely flexible, a force summing member, e.g., a mass, preferably connected adjacent one end of the beam, the other end of the beam being fixed or clamped so that it is not subject to deflection at such location, and a pivot member for the beam positioned on a support at a point intermediate its ends.

I have designed a motion sensing device, according to the instant invention, comprising a freely flexible beam, force summing members e.g., a mass, positioned at opposite spaced sections of said beam, the beam being pivoted on a pair of supports between said force summing members. The opposite pivot members serve as supports for the beam. Further, each of such pivots functions as a point of load reaction, which does not introduce a moment to effectively restrain bending of the beam on both sides of each pivot or load reaction point, so that the beam flexes on both sides of each pivot and is not clamped so as to prevent rotation at such point. In a preferred embodiment, the pivot members are connected to the beam equidistant from the center thereof. Preferably a force summing member is connected to each end of the beam. A pair of motion sensing means, such as a strain wire transducer, are each connected to the beam on opposite sides thereof and also preferably equidistant from the center of the beam.

On flexure of the beam by a force acting thereon, a double deflection of the beam takes place at opposite ends thereof, one deflection at each of the pivot members, and at each of the pivot members the beam flexes on both sides of the pivot. Where the beam is symmetrical and the force summing members, e.g., masses, are spaced equidistant from the center of the beam, and the motion sensing means are also spaced equidistant from the center of the beam, on application of a force to the beam, the beam deflects on opposite sides thereof in opposite directions, and at the mid point or center section of the beam between the pivot members and the two motion sensing means, there is a constraint or a reversal of stress. Where the beam, the force summing members and motion sensing means are such that the beam is completely symmetrical on both sides thereof, the beam tends to remain stationary at its midpoint or point of stress reversal regardless of the amplitude of deflection of the opposite ends of the beam. But where the beam and the components attached to opposite sides thereof render the beam system unsymmetrical, the point of stress reversal will change and will not remain stationary.

Where, for example, the device hereof is in the form of an accelerometer employing equal inertial masses at opposite ends of the beam and the distance between each mass and its adjacent pivot is greater than the distance between each pivot and the midpoint of the beam, flexure of the beam as result of a force inducing a movement of said masses, will produce a displacement of each mass and of the beam between each mass and its adjacent pivot, which is greater than the maximum displacement of the beam along the shorter portions thereof between each of the two pivot points of the beam and its midpoint, or point of stress reversal in the case of a completely symmetrical beam system. If a pair of strain wire transducers is connected to the beam, one between the midpoint of the beam and one of the pivots, and the other between the beam midpoint and the other pivot, such wires will be restrained to a smaller degree than the magnitude of displacement of the masses permitted through flexure of the beam. Instead of connecting a mass to the outer free end of the beam, it is understood that any force summing member may be employed.

The invention will be more clearly understood from the description below taken in connection with the accompanying drawings, wherein:

Fig. 1 is a plan view of one embodiment of the invention;

Fig. 2 is a front elevation taken on line 2—2 of Fig. 1;

Fig. 3 is a section taken on line 3—3 of Fig. 2; and

Fig. 4 is a section taken on line 4—4 of Fig. 2.

In Figs. 1 to 4 there is shown one embodiment of the invention for use as an angular accelerometer, wherein the flexible beam system is symmetrical and is pivoted at two points on opposite sides of and equi-distant from the center of the beam, the midpoint of the beam being the point of stress reversal thereof.

An elongated base member 125 is connected to the bottom of case 127. A flexible beam 129 is mounted above base member 125 parallel thereto, by means of a pair of Cardan suspension springs 131 and 133 located on one side of the beam 129, and a second pair of Cardan suspension springs 135 and 137 located on the opposite side of beam 129. The beam carries at opposite ends thereof the weights 139. The half beam portion 141 of beam 129 is clamped between the midportions 142 of the Cardan springs 131 and 133 by means of washers 143, and bolt and nut fasteners 145, and the opposite half beam portion 147 is similarly clamped between the midportions 144 of Cardan springs 135 and 137. Springs 131 and 133 are mounted at their ends on lugs 149, by means of clamps 151 and bolts 153. Springs 135 and 137 are similarly mounted on lugs 155. Two pairs of oppositely adjustable motion limit stop screws 157, 157 and 159, 159 are mounted on lugs 149, to limit pivotal motion of half portion 141 of beam 129, and two other pairs of motion limit stop screws 161, 161 and 163, 163 are mounted on lugs 155 to likewise limit pivotal motion of the other half portion 147 of the beam.

Carried by beam 129 and positioned between stop screws 159 and the center 165 of beam 129 is a post 167 carrying pins 169, and 171, and the aligned depending pins 173 and 175. On opposite sides of post 167, and connected to the base member 125 by means of brackets 177, are blocks 179 and 181. Block 179 carries a central pin 183 and a depending aligned pin 185, and block 181 carries a central pin 187 and a depending aligned pin 189. Strain wires 191, 193, 195 and 197 are each looped in tension between the respective pairs of pins 169 and 183, 171 and 187, 173 and 185, and 175 and 189. The ends of each of the respective strain wires are connected to two terminals 199 adjacent each of the pins 183, 185, 187 and 189, said terminals being connected by means of wires (not shown) to terminals 201 on the outer sides of blocks 179 and 181.

A similar strain wire structure composed of the same components as noted above, is disposed between stop screws 161 and the center 165 of beam 129, and is connected to beam 129 and to base member 125 in the manner described above. This second strain wire structure is designated by "primed" numbers corresponding to the part numbers of the above described strain wire structure, and includes four strain wires, 191', 193', 195' and 197', corresponding to strain wires 191, 193, 195 and 197.

It will be seen that the beam system of Figs. 1 to 4 is essentially symmetrical with the beam portion 141 and all of the components on said beam portion being essentially the same as beam portion 147 and the components thereon.

In operation of the device of Figs. 1 to 4, assuming counterclockwise acceleration of the instrument about its center corresponding to the center 165 of beam 129, the inertia of masses 139 at the opposite ends of the beam causes a double deflection of the beam 129 at the midportions 142 of each of the springs 131 and 133, and at the midportions 144 of springs 135 and 137, on opposite sides of the beam center 165. In the deflected position of beam 129, each of its half portions 141 and 147, on opposite sides of the midpoint 165, deflects substantially the same amount but in opposite directions. It will be noted that in this embodiment wherein the beam system is essentially symmetrical, irrespective of the amount of deflection of beam 129, the midpoint 165 thereof remains the point of stress reversal.

On deflection of the beam as noted above, beam portion 141 will be deflected downward, and it will be seen that strain wires 193 and 197 will thus be tensioned while strain wires 191 and 195 will be relaxed. Also, deflection of beam portion 147 upward in the opposite direction will cause strain wires 191' and 195' to be tensioned, while strain wires 193' and 197' are relaxed. These two pairs of strain wire systems are each connected in a bridge circuit in a well known manner, and the relative change in resistance in the wires corresponding to the acceleration imparted to the instrument will be indicated by a variation in output of the bridge circuit. When the instrument is accelerated in the opposite direction, i.e., clockwise, beam portion 141 will be deflected upward and beam portion 143 deflected downward. In this case strain wires 191 and 195 will be tensioned while strain wires 193 and 197 are relaxed, and strain wires 193' and 197' will be tensioned while strain wires 191' and 195' will be relaxed. The use of two strain wire systems each connected to beam 129 on opposite sides thereof, increases the total output of the bridge circuit and hence increases the sensitivity of the instrument for a given acceleration.

It will be understood that instead of employing masses such as 139 connected to the outer ends of the flexible beam, I may connect each of these outer portions of the beam to a rod or bellows, and thus convert the instrument from an accelerometer as described above, to a device for measuring force or pressure.

Further, it will be understood that while I have shown a symmetrical beam system, the device need not be symmetrical, and for example, one of the masses 139 can be positioned along the beam at a distance from the center of the beam greater or less than the distance between the other mass and the center of the beam. In this case the point of stress reversal will not be the center of the beam. Also, the distance between the respective weights 139 and the adjacent pivot at the midportion of the adjacent springs can be greater, less than or equal to the distance between such pivots and the center of the beam.

If desired, I may use pivot mountings other than the Cardan springs shown. Thus, for example, I can use a pair of adjacent knife edges as pivots, as disclosed in my copending application filed of even date herewith. Further, I may employ a single Cardan spring at each pivot point instead of the two oppositely disposed springs shown in the drawing.

From the foregoing, it is seen that I have designed a motion sensing device, e.g., in the form of an accelerometer, in which the variation in tension of the strain wires can be made different from, e.g., substantially smaller than, the displacement of the mass, on subjecting the mass to a force or acceleration causing movement thereof. Thus, I can increase the range and sensitivity of the instrument. By adjusting the pivots of the beam and the spring constant or stiffness of the beam, relative to the strain wires, I can also maintain for any desired maximum variation of extension of the wires to be obtained upon a maximum chosen acceleration, any desired displacement of the mass.

While I have described a particular embodiment of my invention for the purpose of illustration, it should be understood that various modifications and adaptations thereof may be made within the spirit of the invention as set forth in the appended claims.

I claim:

1. A motion sensing device which comprises a frame, a flexible beam, a first pivot member connected to said beam, a second pivot member connected to said beam and spaced from said first pivot member, said pivot members positioned intermediate the ends of said beam and permitting double deflection of said beam and providing a point of stress reversal in said beam intermediate said pivot members, said pivot members each being nonrigidly attached to said beam and being a point of load reaction which prevents introduction of a moment which effectively restrains bending of the beam on both sides of each pivot member, force summing means connected directly to said beam and spaced from said pivot members, and a motion sensing means connected to said beam.

2. A motion sensing device which comprises a frame, a flexible beam, a first pivot member connected to said beam, a second pivot member connected to said beam and spaced from said first pivot member, said pivot members permitting double deflection of said beam and providing a point of stress reversal on said beam intermediate said pivot members, said pivot members each being nonrigidly attached to said beam and being a point of load reaction which prevents introduction of a moment which effectively restrains bending of the beam on both sides of each pivot member, a first force summing member connected to said beam adjacent said first pivot member and a second force summing member connected to said beam adjacent said second pivot member, a first motion sensing means connected to said beam adjacent said first pivot member on the opposite side from said first force summing member, and a second motion sensing means connected to said beam adjacent said second pivot member on the opposite side from said second force summing member.

3. A motion sensing device as defined in claim 2, each of said motion sensing means including a wire mounting connected to said beam, an unbonded electrical resistance strain wire connected to said wire mounting, and a connection between said wire and said frame.

4. A motion sensing device which comprises a frame, a flexible beam, a first pivot member connected to said beam, a second pivot member connected to said beam and spaced from said first pivot member, said pivot members each being nonrigidly attached to said beam and being positioned intermediate the ends of said beam, end portions of said beam extending beyond each of said pivot members, said pivot members permitting double deflection of said beam and providing a point of stress reversal on said beam intermediate said pivot members on imposition of forces deflecting the end portions of said beam in opposite directions, a first force summing member connected to said beam and spaced from said first pivot member away from said point of stress reversal, a second force summing member connected to said beam and spaced from said second pivot member away from said point of stress reversal, a first motion sensing means connected to said beam between said first pivot member and said point of stress reversal and a second motion sensing means connected to said beam between said second pivot member and said point of stress reversal.

5. A motion sensing device as defined in claim 4, wherein said force summing members are each a mass of substantially equal weight.

6. A motion sensing device which comprises a frame, a flexible beam, a pair of pivot members for said beam, said pivot members being connected to said beam on opposite sides of the center of said beam and intermediate the ends thereof, end portions of said beam extending beyond each of said pivot members, said pivot members permitting double deflection of said beam and providing a point of stress reversal on said beam intermediate, mountings for said pivot members, a pair of force summing members each connected to an opposite end portion of said beam beyond said pivot members, and a pair of motion sensing means, one connected on one side of said beam between the center of said beam and one of said pivot members, the other motion sensing means being connected between the center of said beam and the other pivot member.

7. A motion sensing device as defined in claim 6, each of said motion sensing means including a wire mounting connected to said beam, an unbonded electrical resistance strain wire connected to said wire mounting, and a connection between said wire and said frame.

8. A motion sensing device as defined in claim 7, wherein said force summing members are each a mass of substantially equal weight.

9. A motion sensing device which comprises a frame, a flexible beam, a pair of pivot members for said beam, said pivot members being connected to said beam on opposite sides of and substantially equidistant from the center of said beam and intermediate the ends thereof, end portions of said beam extending beyond each of said pivot members, mountings for said pivot members, said mountings being connected to said frame, said pivot members permitting double deflection of said beam and providing a point of stress reversal on said beam intermediate said pivot members, a force summing member connected to each of said end portions beyond said pivot members, and a pair of motion sensing means, one connected on one side of said beam between the center of said beam and one of said pivot members, the other motion sensing means being connected between the center of said beam and the other pivot member.

10. An accelerometer which comprises a frame, a flexible beam, a pair of nonrigid spring pivot members for said beam, said pivot members being connected to said beam on opposite sides of and substantially equidistant from the center of said beam and intermediate the ends thereof, end portions of said beam extending beyond each of said pivot members, mountings for said pivot members, said mountings being connected to said frame, said pivot members permitting double deflection on said beam and providing a point of stress reversal on said beam intermediate said pivot members, a mass connected to each of said end portions beyond said pivot members, and a pair of motion sensing means, one connected to one side of said beam between the center of said beam and one of said pivot members, the other motion sensing means being connected between the center of said beam and the other pivot member, each of said motion sensing means including a wire mounting connected to said beam, an unbonded electrical resistance strain wire connected to said wire mounting, and a connection between said wire and said frame.

11. A motion sensing device which comprises a frame, a flexible beam, a first pivot member connected to said beam, a second pivot member connected to said beam and spaced from said first pivot member, said pivot members positioned intermediate the ends of said beam and permitting double deflection of said beam and providing a point of stress reversal in said beam intermediate said pivot members, said pivot members each being non-rigidly attached to said beam and being a point of load reaction which prevents introducing of a moment which effectively restrains bending of the beam on both sides of each pivot member, force summing means connected directly to said beam and spaced from said pivot members, and an unbonded electrical resistance strain wire connected to said beam.

References Cited in the file of this patent

UNITED STATES PATENTS

| | | |
|---|---|---|
| 2,316,975 | Ruge | Apr. 20, 1943 |
| 2,359,245 | Ritzmann | Sept. 26, 1944 |
| 2,373,676 | Germeshausen | Apr. 17, 1945 |
| 2,416,664 | Ruge | Feb. 25, 1947 |
| 2,550,588 | Oberholtzer | Apr. 24, 1951 |
| 2,597,751 | Ruge | May 20, 1952 |